May 5, 1970 E. D. MALONE ET AL 3,510,163
HANDLE DEVICE FOR PANS
Filed April 17, 1968
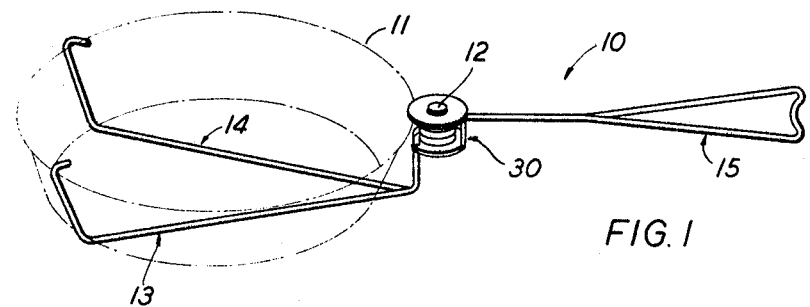
FIG. 1
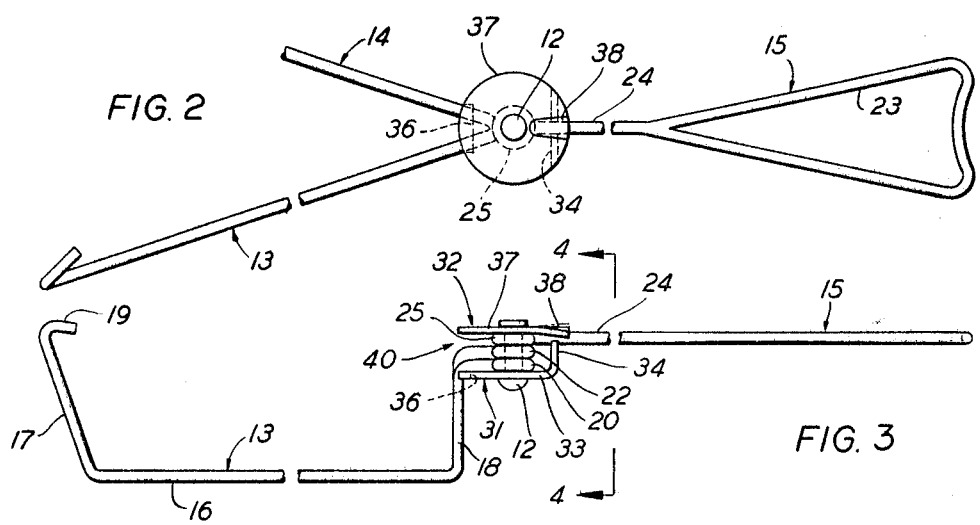
FIG. 2
FIG. 3
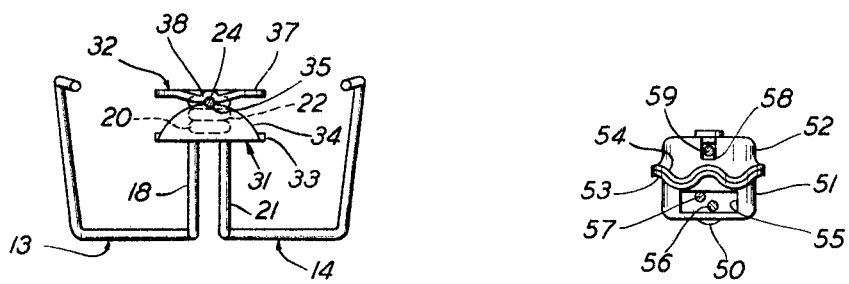
FIG. 4
FIG. 6
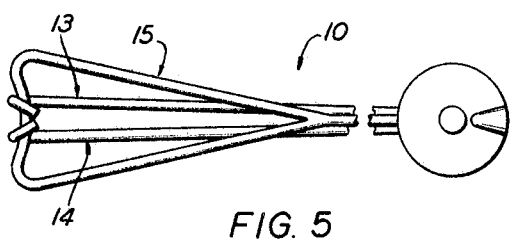
FIG. 5
ERNEST D. MALONE &
ROBERT W. SMITH
INVENTORS
BY
Hayden Pravel Wilson & Matthews
ATTORNEYS

United States Patent Office 3,510,163
Patented May 5, 1970

3,510,163
HANDLE DEVICE FOR PANS
Ernest D. Malone, 525 Jackson Drive, Vidor, Tex. 77662, and Robert W. Smith, 2041 Carolina, Port Arthur, Tex. 77640
Filed Apr. 17, 1968, Ser. No. 722,084
Int. Cl. A47j 45/00
U.S. Cl. 294—29                                    3 Claims

ABSTRACT OF THE DISCLOSURE

A collapsible handle device for use with handleless pans (e.g., disposable aluminum pie pans). The device includes a pair of pan-holding arm members and a handle member pivotally mounted on a central bolt member. Locking means are provided for retaining the arm members and the handle member in an open position when the device is in use.

BACKGROUND OF THE INVENTION

This invention relates to handle devices for use with handleless cooking utensils such as pans and the like.

The handle device of the present invention is intended for use with handleless pans such as pie pans or the like and is particularly useful where such pans are of a disposable nature. Various types of foods are currently being marketed in lightweight aluminum pans, which are intended to be discarded after the food is eaten. Because of the disposable nature of such pans, they are attractive for picnics, camping, and other outdoor affairs. Such foods, however, frequently require heating so that there is presented a problem of handling the pans which hold them.

Disposable pans are also attractive for outdoor cooking of foods not initially provided therein, such as hamburgers, hot dogs, and the like, but again the handling problem is present. For this reason, many people put up with a sooty, greasy fry pan that has to be taken home and cleaned. It would, therefore, be desirable if a handle device could be provided which could be attached to a disposable pan for cooking purposes but which could be readily removed and stored in a compact manner when not in use.

While some forms of handle devices have been heretofore proposed for accomplishing some of these purposes, such prior devices have been of a relatively expensive and relatively cumbersome construction. In general, the previously proposed devices have either not been of a collapsible nature or have not been collapsible to a very high degree.

SUMMARY OF THE INVENTION

It is an object of the invention, therefore, to provide a new and improved handle device for use with handleless pans.

It is another object of the invention to provide a new and improved pan handle device of relatively simple and inexpensive construction.

It is a further object of the invention to provide a new and improved pan handle device of a collapsible nature which may be folded up into a very compact configuration when not in use.

A collapsible handle device in accordance with the present invention includes a central bolt member and a pair of panholding arm members individually having an eye portion at one end and a pan-gripping hook portion at the other end, the eye portions being mounted on the bolt member for rotation thereon. The handle device also includes a handle member having an eye portion at one end, such eye portion also being mounted on the bolt member for rotation thereon. The handle device further includes locking means mounted on the bolt member for retaining the arm members and the handle member in an open position when the device is in use. The locking means is such that moderate pressure exerted by hand will release the handle member and enable the arm members and the handle member to be folded up alongside one another to form a very compact configuration.

For a better understanding of the present invention, together with other and further objects thereof, reference is had to the following description taken in connection with the accompanying drawings, the scope of the invention being pointed out in the appended claims.

BRIEF DESCRIPTION OF THE DRAWINGS

Referring to the drawings:

FIG. 1 is a perspective view showing the handle device in a nopen position and showing the location of a pan in outline form;

FIG. 2 is a top view of the FIG. 1 handle device;

FIG. 3 is a side view of the FIG. 1 handle device;

FIG. 4 is a cross-sectional view taken along the section line 4—4 of FIG. 3;

FIG. 5 is a top view showing the handle device of FIG. 1 in a closed or collapsed position; and FIG. 6 shows a modified form of construction for the center portion of the handle device.

DESCRIPTION OF THE PREFERRED EMBODIMENTS

Referring to FIG. 1, there is shown a handle device 10 for use with handleless pans, one of which is indicated in outline form at 11. Pan 11 may be, for example, a lightweight disposable aluminum pie pan. The handle device includes a central vertically-extending bolt member 12 and a pair of laterally-extending, pan-holding arm members 13 and 14 and a laterally-extending handle member 15. (Directions are taken relative to the usual orientation of the device when in use.)

As best seen in the side view of FIG. 3, the arm member 13 includes an elongated bottom portion 16 adapted to span the underside of the pan 11 and upwardly-extending side portions 17 and 18 located at each end of the bottom portion 16. The upper end of the side portion 17 is bent inwardly to form a pan-gripping hook portion 19. The upper end of the other side portion 18 is bent in the form of a horizontal loop to form a circular eye portion 20. This eye portion 20 is mounted on the bolt member 12, the tolerances being such that a rather snug fit is provided and yet the arm member 13 can be rotated with respect to the bolt member 12.

The other laterally-extending arm member 14 is of similar construction except that its vertically-extending side portion 21 (FIG. 4) which terminates in the eye portion 22 which is fitted over the bolt member 12 is slightly longer to take into account the fact that its eye portion 22 is placed on top of the eye portion 20 of the first arm member 13.

The handle member 15 includes a triangular shaped holding portion 23 and a rod-like shank portion 24, as best seen in the top view of FIG. 2. The end of the shank portion 24 is bent in the form of a horizontal loop to form an eye portion 25 which is mounted on the central bolt member 12. The fit is snug but is such that the handle member 15 can be rotated about the bolt member 12.

The handle device 10 further includes locking means, generally indicated at 30 in FIG. 1, mounted on the bolt member 12 for retaining the arm members 13 and 14 and the handle member 15 in an open position when the device 10 is in use. As better seen in FIGS. 3 and 4, such locking means includes a lower locking member 31 and an upper locking member 32 individually mounted on the vertical bolt member 12 at opposite ends thereof.

The lower locking member 31 is comprised of a flat circular disc portion 33 having a center hole for fitting over the bolt member 12 and an upwardly-extending tab portion 34 located on one side of the bolt member 12 and spaced apart therefrom. A retaining detent or notch 35 (FIG. 4) is formed in the top of the tab portion 34. A rectangular notch 36 (FIGS. 2 and 3) is cut into the horizontal disc portion 33 on the opposite side of the bolt member 12 from the tab member 34. The diameter of the disc portion 33 is such that the shoulders of the notch 36 extend outwardly past the vertical side portions 18 and 21 of the arm members 13 and 14 for purposes of limiting the maximum rotation of the arm members 13 and 14 when the device 10 is in an open position.

The upper locking member 32 is comprised of a flat disc portion 37 having a center opening for mounting on the bolt member 12. The disc portion 37 is crimped on one side to provide a downwardly extending detent portion 38 (FIG. 4) for engaging the shank 24 of the handle member 15 and for co-operating with the detent or notch 35 in the tab portion 34 of the lower locking member 31 for retaining the handle member 15 in the open position when the device 10 is in use.

The arm members 13 and 14 and the handle member 15 are formed from a heavy gauge wire material such as, for example, No. 7 gauge stainless steel wire. The triangular holding portion 23 of the handle member 15 may be formed by bending the wire around in the triangular shape and then welding the free end to the other side of the triangle where it joins with the shank portion 24. The device is assembled by placing the various members on the bolt member 12 in the order indicated in FIG. 3. The top end of the bolt member 12 is then peened or flattened to form a retaining head at such end.

FIG. 1 shows the handle device 10 in an open position. In this regard, it should be noted that the flange on the edge of the pan 11 is to be inserted into the recess indicated at 40 in FIG. 3, which recess is formed between the upper locking disc 37 and the eye portion 22 of the arm member 14 when the device 10 is in its open position. FIG. 5 shows the positioning of the arm members 13 and 14 and the handle member 15 when the device 10 is in its closed position. As there seen, the handle device 10 assumes a very compact configuration when not in use, the arm members 13 and 14 and the handle member 15 lying closely adjacent to and in generally parallel relationship to one another.

Referring to FIG. 6, there is shown a modified form of construction for the locking members mounted on the central bolt member. The bolt member is indicated at 50, while the lower and upper locking members are indicated at 51 and 52, respectively. The locking members 51 and 52 are rotatably mounted on the bolt member 50 and are in the form of opposed cup-shaping members, the open ends of which abut one another and have mating edges having sinuous or undulating profiles. The sinuous edge of the lower locking member 51 is indicated at 53, while the sinuous edge of the upper locking member 52 is indicated at 54. As indicated in FIG. 6, these edges 53 and 54 are bent outwardly to form slightly extending lips on the open ends of the cup members 51 and 52.

The cup members or locking members 51 and 52 of FIG. 6 are shown for the case where the handle device is in its closed position. The lower locking member 51 includes a rectangular opening 55 through which extends pan-holding arm members 56 and 57. The upper locking member 52 is provided with an opening 58 through which extends the shank portion of a handle member 59. The construction of the arm members 56 and 57 and the handle member 59 is the same as discussed in connection with the FIGS. 1-5 embodiment.

The vertical extent of the undulations forming the mating edges of the lower and upper locking members 51 and 52 is such that these locking members may be rotated relative to one another by means of a reasonable amount of hand pressure on the arm members and handle member. In this regard, the extent of the undulations is somewhat exaggerated in FIG. 6 for purposes of clarity. The mating undulations provide a continuous series of detents such that the handle member can be locked in various angular positions relative to the arm members.

What is claimed is:

1. A collapsible handle device for use with handleless pans comprising:
   a bolt member;
   a pair of pan-holding arm members individually having an eye portion at one end and a pan-gripping hook portion at the other end, the eye portions being mounted on the bolt member for rotation thereon;
   a handle member having an eye portion at one end, such eye portion being mounted on the bolt member for rotation thereon; and
   locking means mounted on the bolt member for retaining the arm members and the handle member in an open position when the device is in use, said locking means including upper and lower locking members mounted on the bolt member and individually including co-operating detent means for locking the handle member in an open position.

2. A collapsible handle device in accordance with claim 1 wherein the lower locking member includes means located on one side of the bolt member for engaging the arm members and upwardly extending means located on the other side of the bolt member for engaging the handle member when it is in an open position and wherein the upper locking member includes means for engaging the handle member and urging it in a downwardly direction when it is in an open position.

3. A collapsible handle device in accordance with claim 1 wherein the locking members are rotatably mounted on the bolt member and are in the form of opposed cup-shaped members, the open ends of which abut one another and have mating edges having sinuous profiles for locking the handle member in various angular positions relative to the arm members, the arm members extending through an opening in the side of one of the cup-shaped members and the handle member extending through an opening in the side of the other cup-shaped member.

References Cited

UNITED STATES PATENTS

| | | | |
|---|---|---|---|
| 117,623 | 8/1871 | Hamler | 287—14 X |
| 784,104 | 3/1905 | Caley. | |
| 1,517,776 | 7/1924 | Fisher | 294—28 |
| 3,023,043 | 9/1959 | Ragains | 294—31 |

FOREIGN PATENTS

| | | |
|---|---|---|
| 969,536 | 9/1964 | Great Britain. |

EDWARD A. SROKA, Primary Examiner

W. S. CARSON, Assistant Examiner